United States Patent [19]
Behnke

[11] Patent Number: 5,864,705
[45] Date of Patent: Jan. 26, 1999

[54] OPTIMIZED ENVIRONMENTS FOR VIRTUALIZING PHYSICAL SUBSYSTEMS INDEPENDENT OF THE OPERATING SYSTEM

[75] Inventor: Eric J. Behnke, Boulder, Colo.

[73] Assignee: National Semiconductor Corporation, Santa Clara, Calif.

[21] Appl. No.: 698,670

[22] Filed: Aug. 15, 1996

Related U.S. Application Data

[63] Continuation-in-part of Ser. No. 540,351, Oct. 6, 1995.

[51] Int. Cl.[6] .................................................. G06F 15/76
[52] U.S. Cl. ...................................... 395/800.32; 395/500
[58] Field of Search ..................................... 395/825, 828, 395/835, 868, 412, 500, 182.08, 182.13, 184.01, 733, 734, 739, 740, 742, 800.01, 800.05, 800.28, 800.4, 376, 390, 561, 568, 569, 551

[56] References Cited

U.S. PATENT DOCUMENTS

| | | | |
|---|---|---|---|
| 4,689,766 | 8/1987 | Kent | 395/182.21 |
| 5,218,693 | 6/1993 | Ogita | 395/557 |
| 5,280,626 | 1/1994 | Kando et al. | 395/500 |
| 5,423,008 | 6/1995 | Young et al. | 395/287 |
| 5,590,342 | 12/1996 | Mariesetty | 395/750.06 |
| 5,628,017 | 5/1997 | Kimmerly et al. | 395/704 |
| 5,657,253 | 8/1997 | Dreyer et al. | 364/551.01 |

*Primary Examiner*—Alpesh M. Shah
*Attorney, Agent, or Firm*—John L. Maxin

[57] ABSTRACT

A computing system having a processor employs an accelerated virtual subsystem architecture which may reside in either the processor or chipset logic circuitry disposed on the motherboard. The accelerated virtualization process employs at least one phantom read register that provides logical status information in response to an I/O read operation or operations—avoiding engagement of the system management mode as fulfillment of the virtualization process. The at least one phantom read register is updated by the virtualization process and supplies the expected response to an application/driver program running on the processor responsive to the execution of an I/O read operation without invocation of an SMI. Preferably, at least one latch is further provided to buffer writes of indexes of index/data write pairs to further avoid engagement of the system management mode as fulfillment for the virtualization process. When the data write of the index/data pair write occurs, application/driver software retrieves the buffered index for use in the virtualization process to virtualize the appropriate behavior. Alternatively, multiple index/data write pairs may be gathered and acted on when a predetermined index value is recognized.

14 Claims, 4 Drawing Sheets

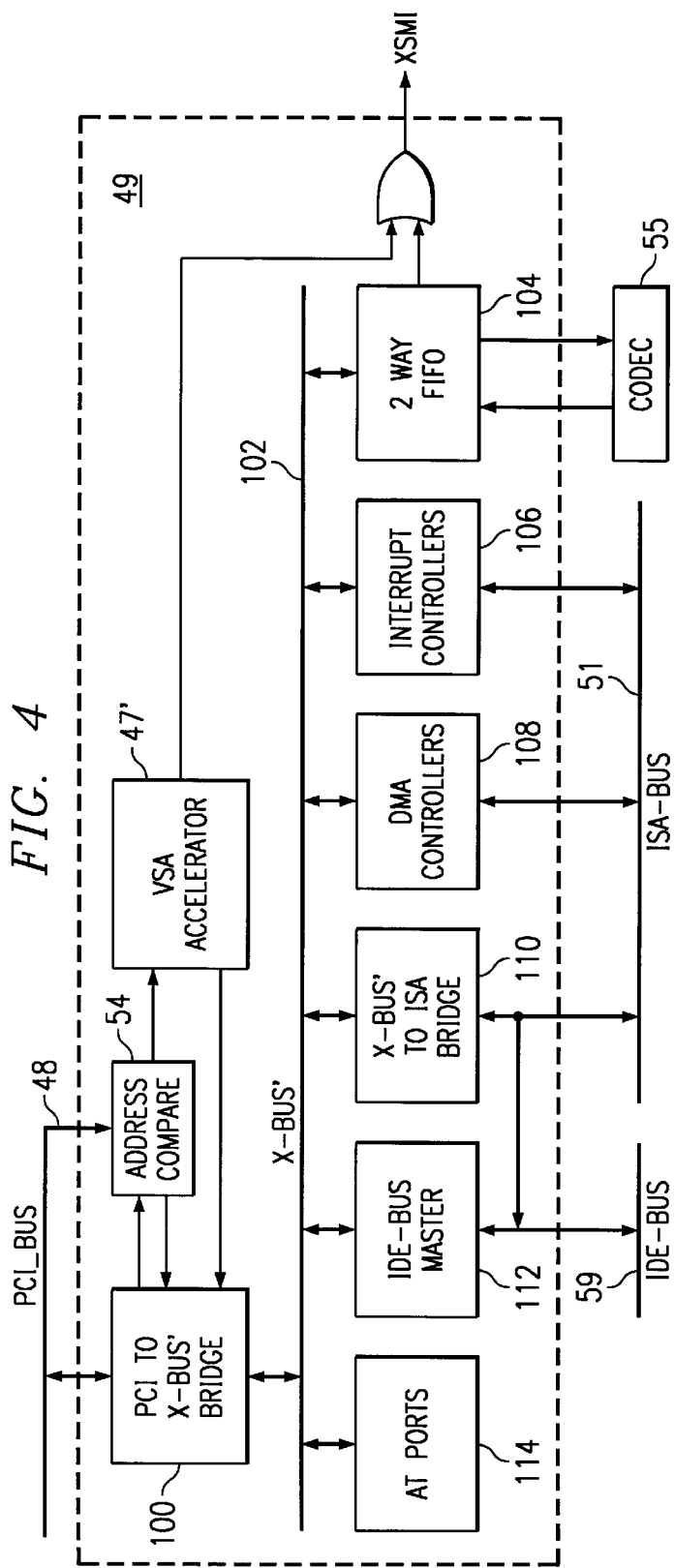
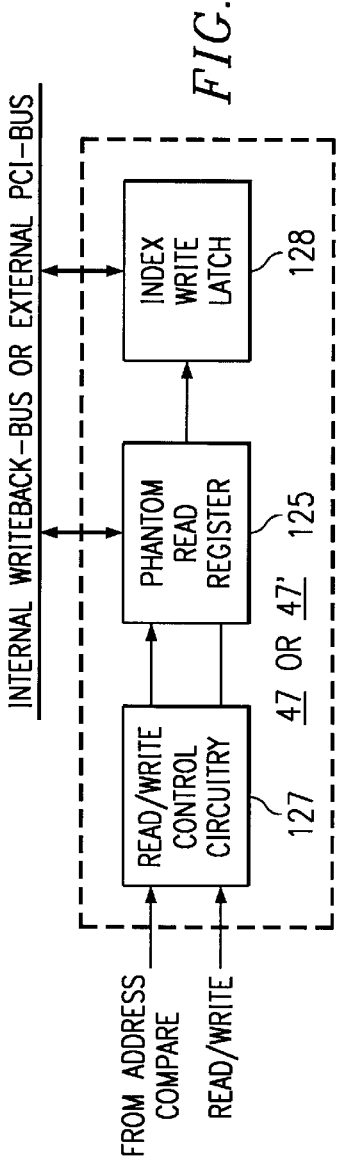

OPTIMIZED ENVIRONMENTS FOR VIRTUALIZING PHYSICAL SUBSYSTEMS INDEPENDENT OF THE OPERATING SYSTEM

CROSS-REFERENCES TO RELATED APPLICATIONS

This patent application is a continuation-in-part of commonly assigned U.S. patent application Ser. No. 08/540,351 (Docket No: CX00253), entitled "Virtual Subsystem Architecture" filed Oct. 06, 1995, the disclosure of which is herein incorporated by reference.

BACKGROUND OF THE INVENTION

1. Field of the Invention:

The invention broadly relates to maintaining compatibility with legacy software and hardware in modern computer systems, and more specifically to mitigating the latencies that commonly occur in the input/output (I/O) read and write paths of "virtualized" devices.

2. Description of Related Art:

Emulation, the concept of manipulating a device with software to provide the functionality of another similarly functioning device, is ubiquitous. For example, a typical application for emulation is in the art of so-called "dumb" terminals. In this regard, compatibility is provided by interpreting or mapping keystrokes and display formats intended for one particular type of terminal to another type of terminal. Emulation therefore, permits software commands and queries to transcend hardware platforms.

By way of contrast, the Assignee of the present invention has pioneered a new concept known as a "virtual subsystem architecture" which is starkly different from emulation in that it provides the functionality or compatibility with popular legacy hardware subsystems such as modems, sound cards, and display cards—but with only employing the general purpose resources of a modern processor. The general scheme for the virtual subsystem architecture is described in U.S. patent application Ser. No. 08/540,351, which was herein incorporated by reference. A particular application to audio generation and capture is described in U.S. patent application Ser. No. 08/458,326, which is also herein incorporated by reference. An enhanced system management mode suitable for use with the present invention is described in commonly assigned U.S. patent application Ser. No. 08/541,359 (Docket No: CX00258), which is also herein incorporated by reference.

Through observation and experimentation, the inventor of the present invention has found that real-time applications in the virtual subsystem architecture appear to have a lackluster performance due to the combination of: i) limitations of legacy hardware requiring a delay to be inserted between two successive write operations; ii) idiosyncratic techniques of application and driver software for accomplishing these delays; and, iii) the overhead associated with the entrance and exit with respect to simple operations during virtualization.

One illustrative, but not limiting example of lackluster performance in the virtual subsystem architecture occurs when a sound card such as a SoundBlaster™ from Creative Labs Corporation of Milpitas, Calif. is virtualized. The sound card typically performs so-called "FM-synthesis" sound generation by employing a dedicated FM-synthesis integrated circuit known as an OPL-2 or OPL-3 (a later generation) chip from the Yamaha Corporation of Japan. The OPL-3 (which is essentially a superset of the OPL-2) chip is programmed through writes to its internal registers to define characteristics of tones and timbres for the desired output sound. The sound card maps the internal registers of the OPL-3 chip to specific I/O addresses recognized by the personal computer (PC). Hence, the OPL-3 chip is programmed through the I/O space of the PC by application/driver software which write an "index and data" pair to program a single internal register within the OPL-3. The index identifies which internal register within the OPL-3 chip is being addressed while the data sets the new value for that internal register.

As a consequence of the OPL chip design and speed of modern processing systems, a delay is required between the write operation of the index and the write operation of the data. The required delay however, varies among vintages of OPL chips and consequently, existing application/driver software inserts a minimum delay of six microseconds as a "safe harbor", more typically fifteen microseconds, and on upwards of twenty-five microseconds. The delay is ordinarily supplied by making multiple so-called "faux-reads" (i.e. read instructions whose result is irrelevant) to a "status" register on the OPL-3 chip with each faux-read presumed to have a duration of an ISA I/O cycle of approximately one microsecond. Accordingly by way of example and not limitation, executing fifteen faux-reads between index and data writes would roughly induce fifteen microseconds of delay based on the expected I/O cycle latency. It should be noted at this point that some reads by the application/driver software are not faux-reads and actually rely upon the status information returned from the read of the OPL-3 chip.

A drawback with this method of delay inducement (i.e. relying on a duration of an ISA I/O cycle) exists when employing the virtual subsystem architecture. Specifically, if faux-reads are trapped and acted upon under the system management mode mechanism as part of the virtualization process, an excessive amount of delay is induced due to the relatively large entrance/exit overhead with respect to the simple faux-read operation. By way of example and not limitation, it is common for applications/drivers to insert fifteen faux-reads between the index write and the data write in order to induce an approximate fifteen microsecond delay. Assuming arguendo that the entrance/exit overhead of the system management mode mechanism for each virtualized faux-read instruction takes three microseconds, then a delay loop comprising of fifteen faux-reads actually induces a delay of forty-five microseconds—thirty microseconds longer than intended. Therefore, depending on the amount of audio processing, the addition of the unintentional delay may cut into the bandwidth of the processor to a point where the motion of graphics drawn to the display become jerky.

Ignoring the trap on all I/O read instructions to improve performance is not an acceptable solution since as previously mentioned, some application and driver software rely on the status information returned from the read of the OPL-3 chip. Other options to improve performance may include adding a coprocessor or some other form of substantially dedicated hardware—increasing cost and minimizing any savings yielded from eliminating the original device. Moreover, simply increasing the speed of the processor offers some improvement but also increases attendant system complexity, power consumption, and cost.

Accordingly, it can be seen from the foregoing, that there is a need for an accelerated virtual subsystem architecture to accelerate the virtualization process of subsystems with minimal additional hardware resources and to overcome the obstacles presented by the delay inducement technique of legacy software.

SUMMARY OF THE INVENTION

To overcome the limitations of the prior art described above, and to overcome other limitations that will become apparent upon reading and understanding the present specification, the present invention discloses an accelerated virtual subsystem architecture and methodology in a computer system providing control circuitry for the read and write paths to avoid unnecessary invocation of the virtualization process under the system management mode. Included in the read path are phantom read registers that provides status information responsive to selected I/O read operations without invoking the system management mode. The phantom read registers need not be contiguous physical registers but rather, chunks of status information may be pieced together from various portions from within processor/chipset logic circuitry to form a logical status byte/word for presentation to the application/driver software in response to selected I/O reads. The control circuitry deflects all but selected I/O read operations to their proper venue—permitting only the selected I/O read operations to access the phantom read registers without invoking the system management mode—thus avoiding the overhead associated with entering and exiting the virtualization process for simple status read inquiries.

Preferably, included in the write path are hardware latches, responsive to the control circuitry for selected I/O writes, for holding index values from writes of index and data pair values. The control circuitry refrains from engaging the system management mode on an index write until a companion data value is written—reducing the latency associated with entering and exiting the system management mode. Upon application/driver software writing the data value, an SMI is invoked and the index/data pair is presented for evaluation to the virtualization process under the system management mode.

It is further contemplated that through the use of multiple phantom read registers and hardware latches, multiple index and data pairs can be "gathered" without engaging the system management mode until a predetermined index is recognized, at which time the system management mode is engaged and all of the multiple index and data pairs are acted on.

A first preferred embodiment of the present invention embeds the improved circuitry local to the processor core on the processor die—avoiding a chipset bus cycle in determining whether the I/O address applies to the accelerated process and for quickly returning status information without generating an SMI to engage the system management mode.

A second preferred embodiment provides the improved circuitry in the chipset logic circuitry to intercept reads over the chipset bus to predetermined I/O address(es) and to return status information without generating an SMI to engage the system management mode.

Third and fourth preferred embodiments further include latches in the improved circuitry of the first and second embodiments to latch the written index value of a written index and data pair, without generating an SMI to engage the system management mode, and for generating an SMI to engage the system management mode for the virtualization process to provide both index and data values when a data value is finally written.

A feature of the present invention is removing latency from virtualization steps associated with I/O read and write operations.

Another feature of the present invention is utilizing time previously wasted as a consequence of legacy delay inducement techniques, for performing virtualization steps—making the virtual subsystem in some instances, faster than the original hardware subsystem.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a computer system having an accelerated virtual subsystem architecture, in accordance with the principles of the present invention.

BRIEF DESCRIPTION OF THE DRAWINGS

FIG. 4 is a block diagram of the chipset logic circuitry including a second preferred embodiment, practiced in accordance with the principles of the present invention;

FIG. 5 is a schematic diagram of the VSA acceleration circuitry for use with first, second, third, and fourth preferred embodiments of the present invention; and, FIG. 6 is flow diagram of method steps performed by the VSA acceleration circuitry depicted in FIG. 5.

DESCRIPTION OF THE PREFERRED EMBODIMENT

Figure 1:
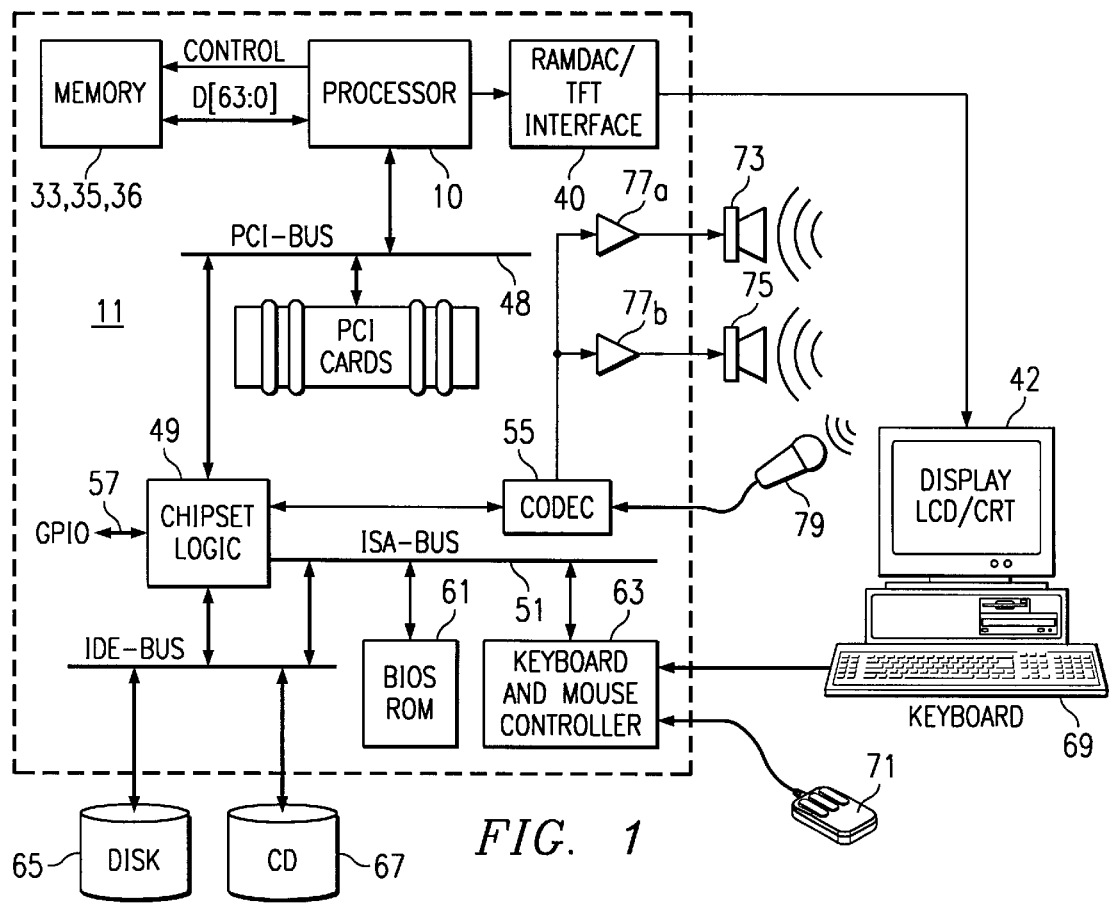
FIG. 1 is an exemplary, but not exclusive, block diagram of a computer system employing an accelerated virtual subsystem architecture practiced in accordance with the principles of the present invention.

The detailed description of the preferred embodiment for the present invention is organized as follows:

1. Exemplary System Employing A Virtual Subsystem Architecture
    1.1 General System Overview
    1.2 Block Diagram Of Preferred Processor
2. Exemplary Reentrant System Management Mode Mechanism
3. Event Trapping In A Pipelined Core
4. Chipset Logic Circuitry
5. VSA Acceleration Circuitry
    5.1 Sound Card Application
6. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 computer architecture, it has general applicability to any architecture. Certain terminology related to the x86 computer architecture (such as register names, signal nomenclature, etc.) which are known to practitioners in the field of microprocessor design, are not discussed in detail in order not to obscure the disclosure.

Moreover, structural details which will be readily apparent to those skilled in the art having the benefit of the description herein have been illustrated in the drawings by readily understandable block, state, and flow diagrams, showing and describing details that are pertinent to the present invention. Thus, the illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Throughout the specification, it is to be understood that the term "handler" is used to describe a convenient functional program module that is executed by the processor. It is also to be understood that a condition, event, or method of implementation of a function being "transparent to an application program" describes that the application program neither knows nor needs to know of the condition, event, or method of implementation of a function to execute properly. It should also be understood that the term "control registers" is used throughout the specification to describe a mechanism for holding programmable values to select control, program, and data flow. Those skilled in the art, with the aid of the present disclosure, will recognize many forms and locations for control registers without departing from the scope of the present invention. The term "virtualize" is intended to mean simulation of properties expected of a device or subsystem responsive to an application program, without the actual presence of the device or subsystem, transparent to the application program. The terms "isochronous" or "real-time run" are intended to describe devices or subsystems having a temporal criticality associated with them for proper operation.

1. Exemplary Computer System Employing A Virtualized Display Subsystem 1.1 General System Overview Reference is now made to FIG. 1 which depicts an exemplary, but not exclusive, block diagram of a computer system employing an accelerated virtual subsystem architecture practiced in accordance with the principles of the present invention. A system circuit board (a.k.a. motherboard) 11 includes a processor coupled over sixty-four bit data lines and associated control lines to memory 33, 35, and 36 (detailed in FIG. 2) through its integral memory controller 28 (also detailed in FIG. 2). The processor 10 is further coupled through its integral display controller 20 (FIG. 2) to either a thin film transistor (TFT) display panel interface or RAMDAC 40 and to a display 42 (either LCD or Cathode Ray Tube, respectively). The processor 10 further provides an externally assessable PCI-Bus 48 through its integral PCI controller 26 (FIG. 2). Additional PCI peripherals cards (e.g. modem, DVD, or extended graphics) may be attached to the PCI-bus 48. Chipset logic circuitry 49 acting as a so-called "south bridge" couples the processor 10 over the PCI bus 48 to a ISA-Bus 51, an IDE-Bus 59, an audio codec 55, and provides general purpose I/O (GPIO) pins 57.

The ISA-Bus 51 maintains compatibility with industry standard peripherals, including but limited to, BIOS ROM 61 and keyboard/mouse controller 63. The keyboard/mouse controller 63 interfaces the ISA-Bus 51 to a keyboard 69 and a mouse 71. Chipset logic circuitry 49 (described in more detail hereinbelow) provides an IDE bus master (FIG. 4) to control two or more mass storage devices off of the IDE-Bus 59 such as, but not limited to, a hard disk drive 65 and CD ROM player 67.

The audio codec 55 provides digital-to-analog conversion to drive left and right speakers 73 and 75 through stereo amplifier $77_a$–$77_b$, respectively. It should be understood that codec 55 and amplifier 77 could be expanded to more channels without departing from the scope of the present invention. The audio codec 55 also provides analog-to-digital conversion for analog signals originating, for example, from microphone 79. Analog signals could originate from other sources such as, but not limited to, line outputs from a CD player or a VCR (neither shown) without departing from the scope of the present invention.

A multi-tasking operating system program such as Microsoft® Windows™ or derivatives thereof preferably executes on the processor 10 to manage primary operations.

1.2 Block Diagram Of Preferred Processor

Figure 2:
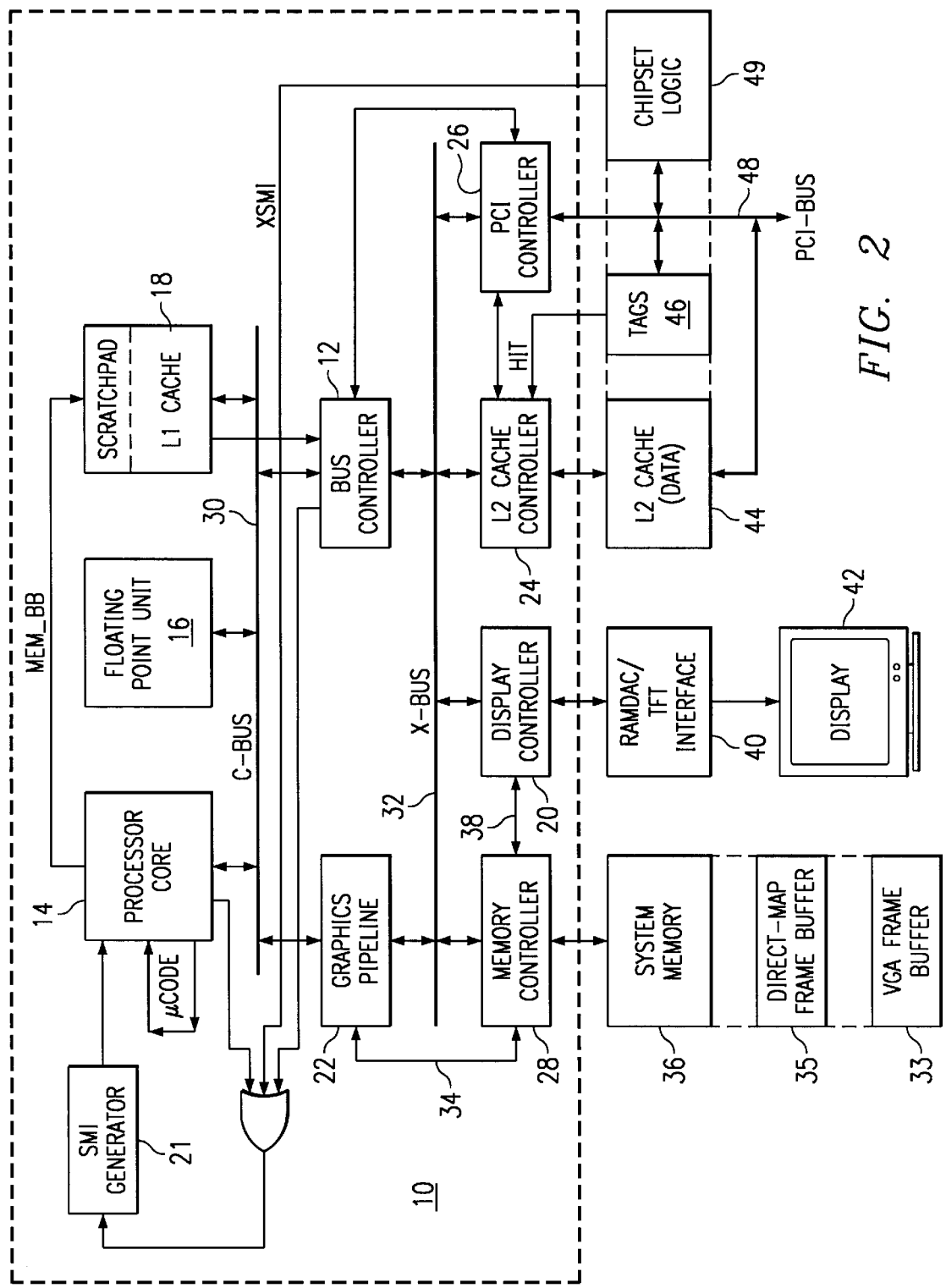
FIG. 2 is a more detailed block diagram of pertinent portions of the computer system depicted in FIG. 1.

Reference is now made to FIG. 2 which depicts a more detailed block diagram of pertinent portions of the computer system depicted in FIG. 1.

The processor 10 preferably includes the following functional units: an internal bus controller 12, a processor core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a PCI-bus controller 26.

The bus controller 12, the processor core 14, the FPU 16, the L1 cache 18, and the graphics pipeline 22, are coupled together through an internal (with respect to the processor 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the processor 10) X-bus 32. The details of the C-bus 30 and X-bus 32 are not necessary for the understanding of the present invention. It is sufficient to understand that independent C and X buses 30 and 32 de-couple these functional units within the processor 10 so that for example, the processor core 14, the FPU 16, and L1 cache 18 can operate substantially autonomously from the remainder of the processor 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the processor core 14 is performing an unrelated operation.

The processor core 14 in the preferred embodiment employs a six stage pipeline. The exact details of the processor core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other numbers of stages for the pipeline and other configurations for the processor core 14 without departing from the scope of the present invention.

The L1 cache 18 is preferably, although not exclusively, a 16K byte unified data/instruction cache that operates in either a write-through or write-back mode. An area of the L1 cache 18 can be programmably partitioned as the scratchpad memory through configuration control registers (not shown) in the processor core 14. Scratchpad control circuitry in the L1 cache 18 includes data pointers which can be used by either the processor core 14 or the graphics pipeline 22 to access data in the scratchpad memory. The scratchpad memory may also be addressed directly by the processor core 14.

An exemplary, but not exclusive, use for the scratchpad memory is as a blit buffer for use by the graphics pipeline 22. More specifically, whenever data is moved on the display 42, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35.

Programs executed by the processor core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending US patent application Serial No: 08/464,921, filed Jun. 05, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate from the L1 cache 18 without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the processor core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBlt operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/Thin Film Transistor (TFT) interface 40 which in turn drives a display 42.

The L2 cache controller 24 and PCI controller 26 collectively provide, inter alia, a high speed interface for an "off-chip" L2 cache 44 (with respect to the processor 10). The preferred, although not exclusive, L2 cache interface is described in co-pending US patent application Ser. No: 08/522,219, filed Aug. 31, 1995, entitled "L2 Cache Interface", assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the processor 10, without departing from the scope of the present invention.

In the preferred embodiment, the exemplary SMI generator 21 receives a first input from the processor core 14, a second input from the internal bus controller 12, and a third input (XSMI) from a source external to the processor 10, preferably in the chipset logic circuitry 49. Those skilled in the art will recognize other forms for the SMI generator 21 and other inputs to the SMI generator 21 without departing from the scope or spirit of the present invention.

Chipset logic circuitry 49, described in more detail hereinbelow, is coupled to the PCI-bus 48 and preferably has interface circuitry including, but not limited to, FIFO buffers for receiving incoming and outgoing data and indicators to indicate fullness of a given buffer. The chipset logic circuitry 49 preferably may also includes comparators, timers, and other trap-like circuitry to detect and indicate the occurrence of predetermined events outside the processor 10.

2. Exemplary Reentrant System Management Mode Mechanism

The preferred embodiment of the present invention supports a reentrant system management mode (SMM) mechanism which is a supervisory operating mode with multiple threads of execution, entered in response to a high priority system management interrupt (SMI). The SMI generator 21 generates an SMI responsive to the occurrence of several events, described in more detail hereinbelow. An exemplary, but not exclusive reentrant SMM, is disclosed in pending US patent application Ser. No: 08/541,359 entitled "Enhanced System Management Mode With Nesting", Attorney's Docket No. CX-00258, assigned to the Assignee of the present invention, and herein incorporated by reference. Those skilled in the art will recognize other forms of reentrant SMM without departing from the scope of the present invention. For purposes of the present invention, it is sufficient to understand that the reentrant SMM mechanism permits programs under the virtual subsystem architecture time-division-multiple-access (TDMA) and/or demand driven access to the processor core 14 for execution on a hierarchical basis.

3. Event Trapping In A Pipelined Core

Figure 3:
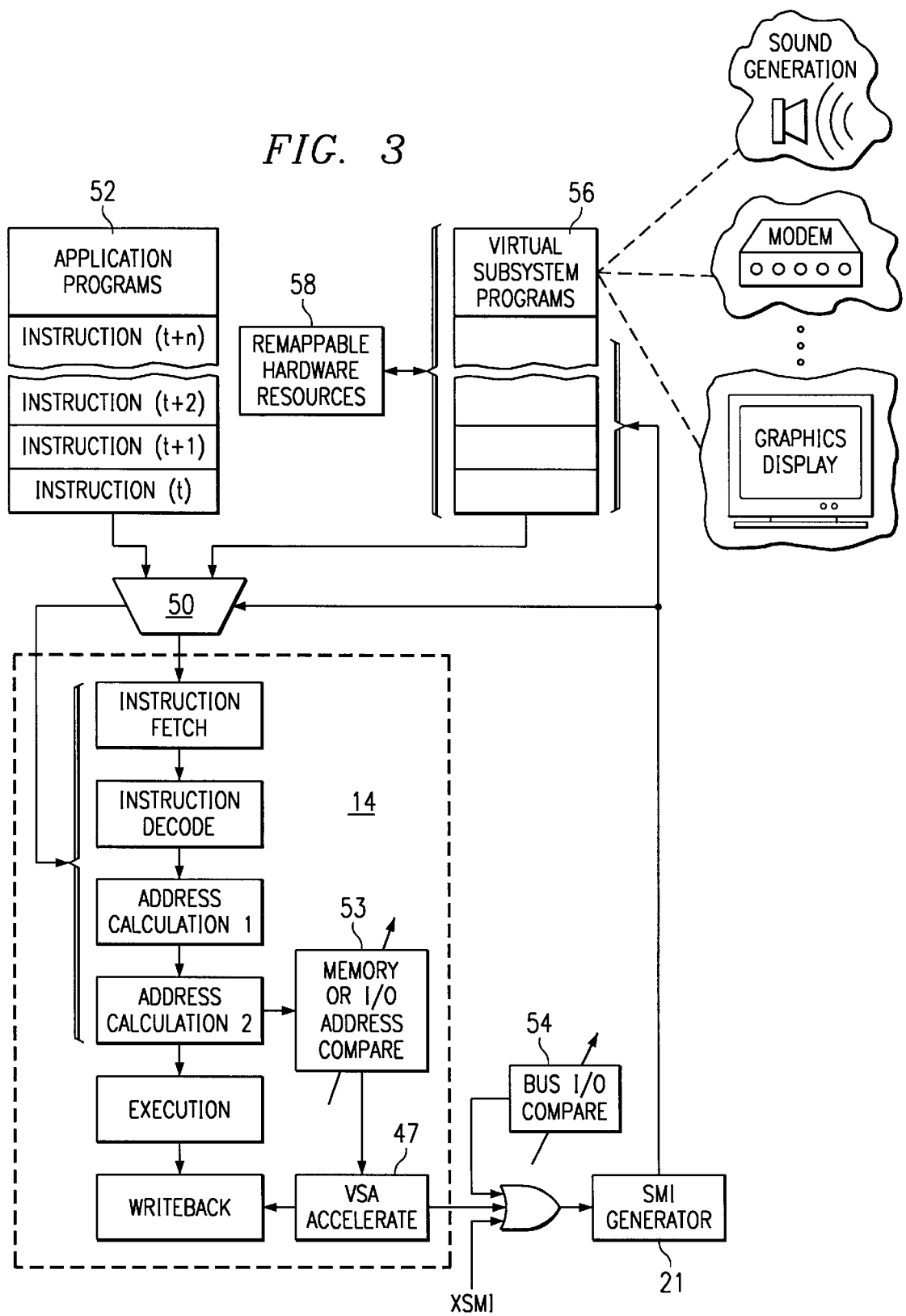
FIG. 3 is a block diagram of the accelerated virtual subsystem architecture practiced in accordance with the principles of the present invention.

Reference is now made to FIG. 3 which depicts a more detailed block diagram of the datapath for the virtual subsystem architecture, input conditions for triggering the reentrant SMM mechanism, and the pipelined processor core 14, in accordance with the principles of the present invention. A multiplexer 50 ordinarily routes instructions from the application programs 52 through processor core 14 for execution. As described above, the preferred embodiment for processor core 14 is a six stage pipeline. Physical address calculations performed during the address translation (fourth) stage are compared with programmable address ranges for memory mapped and I/O mapped peripherals by compare circuitry 53. The address ranges for compare circuitry 53 are programmable through control registers (not shown) preferably, although not exclusively, located in the processor core 14.

Assuming Instruction (t) references an address that matches an address in a range programmed in compare circuitry 53 and the address is not effected by VSA accelerate circuitry 47 (described in more detail hereinbelow), an SMI is generated by SMI generator 21 which, among other things, flushes instructions on the pipeline starting with Instruction (t+1) which then resides in the address calculation 2 stage and continuing on back through the instruction fetch stage. Instruction (t) which then resides in the execution stage and Instructions (t–1) et seq. which reside in the Writeback stage, continue on through to the C-bus. Instruction (t) is preferably quashed by bus controller 12 (depicted in FIG. 2).

The output of compare circuitry 53 in the processor core 14 is coupled to an input on VSA accelerate circuitry 47. As described hereinbelow, VSA accelerate circuitry 47 provides a first conditional SMI input to SMI generator 21. The conditions for VSA accelerate circuitry 47 asserting the first SMI input are described in more detail hereinbelow. A second input to the SMI generator circuitry 21 is coupled to an external SMI input (XSMI), which for example, as described above, may be asserted by the chipset logic circuitry 49 to indicate that an input buffer is full. Alternatively, as described in more detail hereinbelow, the XSMI input may be asserted by alternative VSA accelerate circuitry 47' residing in the chipset logic circuitry 49. Note that alternative VSA accelerate circuitry 47' is represented with a prime. A third input to the SMI generator circuitry 21 is coupled to Bus I/O compare circuitry 54 (preferably located in the internal bus controller 12 of FIG. 2) which can detect I/O accesses at the C-bus 30 level. The address ranges for alternative VSA accelerate circuitry 47' and Bus I/O compare circuitry 54 are also programmable through control registers (not shown) however preferably located in the chipset logic circuitry 49 and internal bus controller 12, respectively.

Upon the assertion of one of the three inputs to SMI generator 21, the SMI generator 21 invokes a handler to: i) determine the source of the SMI; ii) point to the appropriate entry address in the virtual subsystem programs 56; iii) flush the application program instructions in pipe stages one through five of the processor core 14; and iv) switch multiplexer 50 to route the selected virtual subsystem program into the processor core 14 for execution. Accordingly, the handler provides a software decode mechanism, allowing additional virtual systems to be easily added.

The virtual subsystem programs 56 may be assisted with remappable virtual hardware resources 58. Remappable hardware resources D8 may include, but are not limited to, a CODEC, a timer, a comparator, and a counter, preferably shared on a TDMA basis among the virtual subsystem programs. That is, instead of duplicating hardware resources for each individual virtual subsystem, a resource may be mapped (through control registers or software program initiated control) to assist the virtual subsystem currently being executed.

According to principles of reentrancy and isochronous "real-time run" virtualization in the present invention, the program which is virtualizing a modem can reenter itself, interrupt the programs virtualizing sound generation or graphics display, or resume the application programs. Similarly, the program which is virtualizing sound generation can reenter itself, interrupt the program virtualizing the graphics display, or resume the application programs. Lastly, the program which is virtualizing a graphics display can reenter itself or resume the application programs. It should be understood that the exemplary reentrancy just described is but one of many examples for which the invention may be practiced. Those skilled in the art will recognize other number of subsystems and hierarchies without departing from the scope or spirit of the present invention.

4. Chipset Logic Circuitry

Reference is now made to FIG. 4 which depicts a more detailed block of the chipset logic circuitry 49 practiced in accordance with the principles of one embodiment of the present invention. PCI to X-Bus' Bridge circuitry 100 bridges the external PCI-Bus 48 to the internal X-Bus' 102 (with respect to chipset logic circuitry 49). It should be noted that X-Bus' 102 can be thought of as an external extension of X-Bus 32 (internal to processor 10). Accordingly, it is contemplated that some or all of the functional block circuitry coupled to X-Bus' 102 in FIG. 4 may be integrated directly into the processor 10 without departing from the scope of the present invention.

Bus I/O compare circuitry 54 is coupled to the PCI-bus 48 and monitors for selected addresses (determined by programmed control registers) similar to memory or I/O address compare circuitry 53 located in the processor core 14. It should be understood that only circuitry 53 or 54 singularly, is required for the present invention. However for completeness, two preferred embodiments are presented—a first which involves integrating the improved circuitry into the processor core 14 and a second which resides in the chipset logic circuitry 49 and relies on external bus cycles (with respect to the processor 10), both described in more detail hereinbelow.

Likewise, VSA accelerate circuitry 47' is similar to VSA accelerate circuitry 47 located in the processor core 14. The primary advantage of locating the improved circuitry of the present invention in the chipset logic circuitry 49 is less interference with processor core 14 operation and less constraint on the die space of the processor 10. On the other hand, locating the improved circuitry of the present invention in the processor core 14 avoids the latency of cycles over the PCI-Bus 48 which are required to access circuitry in chipset logic circuitry 49.

A two-way FIFO 104 preferably, although not exclusively, has thirty-two or less/more entries—each thirty-two bits wide, and is coupled to the codec 55. The two-way FIFO 104 buffers incoming and outgoing data from/to the codec 55. Programmable interrupt controllers 106 are coupled between the ISA-Bus 51 and the X-Bus' 102 for handling interrupt requests from either the PCI-Bus 48 or the ISA-Bus 51. In the preferred embodiment, programmable interrupt controllers 106 are compatible with 8259 interrupt controllers from Intel Corporation of Santa Clara, Calif. DMA controllers 108 are coupled between the ISA-Bus 51 and the X-Bus' 102 for controlling direct memory accesses from I/O devices on the ISA-Bus 51 to memory on either the PCI-Bus 48 or the ISA-Bus 51. In the preferred embodiment, DMA controllers 108 are compatible with 8237 DMA controllers from Intel Corporation of Santa Clara, Calif. X-Bus'-to-ISA bridge 110 bridges the external ISA-Bus 51 to the internal X-Bus' 102 of chipset logic circuitry 49. IDE bus master 112 may interface and master at least two peripherals on the IDE-Bus 59, typically a hard disk drive 65 (FIG. 1) and a CD-ROM 67 (FIG. 1). AT ports 114 provide compatibility circuitry to support, inter alia, a math coprocessor, keyboard controller, fast processor reset, NMI/speaker control interface.

5. VSA Acceleration Circuitry

Figure 6:
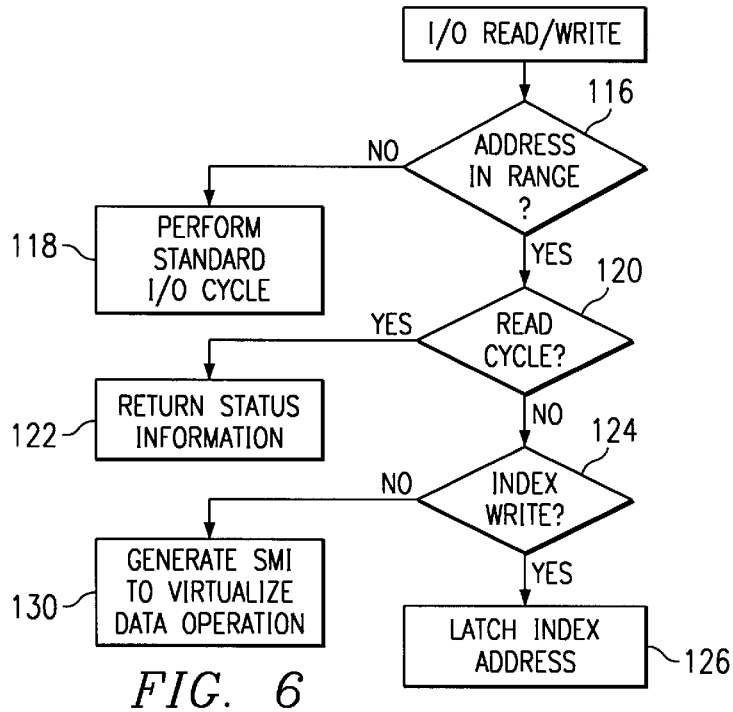

Reference is now made to FIGS. 5 and 6 which depict a schematic diagram of the VSA acceleration circuitry and a flow diagram of method steps performed therewith, respectively. VSA accelerate circuitry 47 is coupled, depending upon which implementation is chosen (i.e. internal to the processor 10 or within chipset logic circuitry 49), to either the internal writeback bus of the processor core 14 or the external PCI-Bus 48. In either implementation however, the circuitry of FIG. 5 and method steps depicted in FIG. 6 are applicable. At step 116, the addresses of I/O read and write operations are compared with a range of values programmed into the control registers. If none of the addresses match, a normal ISA I/O cycle is exercised at step 118 via the PCI-to-ISA bridge formed by chipset logic circuitry 49.

If a match occurs, then step 120 determines whether it is a read or write operation. If the operation is an I/O read to a selected address region, step 122 (phantom read register 125) returns status information to the application/driver software without engaging the system management mode. It should be noted that the phantom read register 125 need not be a contiguous or dedicated physical register for purposes of holding status information. Rather, status information can be gathered from multiple general purpose registers and presented as a logical contiguous byte/word to the application/driver software.

If at step 124 it is determined that the I/O write operation is writing an index value of an index/data pair write, then the written index value is latched at step 126 (with index latch 128) without engaging the system management mode. Otherwise at step 130, the write operation is presumed to be a data value and the system management mode is engaged to virtualize the intended function using the index value latched in index latch 128 along with the data value currently being written by the application/driver software. It should also be understood that the VSA acceleration circuitry 47 of the present invention preferably may also be enabled/disabled through a control bit in a control register.

While not specially depicted, it is further contemplated that through the use of multiple phantom read registers (e.g. 125$_a$–125$_z$) and multiple index write latches (e.g. 128$_a$–128$_z$), multiple index and data pairs can be "gathered" without engaging the system management mode until a predetermined index is recognized in one of the index write latches 128$_a$–128$_z$, at which time the system management mode is engaged and all of the multiple index and data pairs are acted on under the virtualization process. Such an implementation may include programmable comparators coupled to the index write latches 128$_a$–128$_z$ to compare and identify a predetermined index value for which the system management mode—ergo the virtualization process is invoked.

5.1 Sound Card Application

By way of example, assume control registers in the processor core 14 or chipset logic circuitry 49 are programmed to capture addresses intended for the Sound-Blaster™ sound card (e.g. 388-38Bh, 2-0-2x3h, and 2x8-2x9h, "x" being a "don't care state"). In accordance with principles of the present invention, step 116 detects an I/O operation to one of these addresses. On a read operation to one or more of these addresses—whether a faux-read for delay inducement purposes or a legitimate status inquiry, status information is returned to the application/driver software without engaging the system management mode. Similarly on a write to these addresses, step 124 detects whether it is an index write and if so, latches the index value without engaging the system management mode. On a subsequent write to these addresses (presumed to be data), the system management mode is engaged for the virtualization process.

A feature and advantage of the present invention is recovering valuable time which would have been otherwise expended for an ISA I/O cycle with the actual sound card hardware or for overhead associated with the entrance/exit to/from the system management mode. This recovered time amortized over the run-time of the application program in some instances, makes the virtualized hardware execute faster with respect to the actual hardware.

6. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the claims.

What is claimed is:

1. A computer system employing an accelerated virtual subsystem architecture comprising:

(a) a processor running an operating system and at least one program by executing a series of program instructions;

(b) address compare circuitry to detect selected I/O instructions being executed by the processor;

(c) acceleration circuitry, coupled and responsive to the address compare circuitry, to provide status information when the selected I/O instructions are read instructions; and;

(d) a system management mode mechanism independent of the operating system and invokable by the acceleration circuitry when the selected I/O instructions are write instructions, to feed instructions to the processor for execution to perform an equivalent function ordinarily performed by a physical subsystem in response to the write instructions.

2. A computer system as recited in claim 1 wherein the acceleration circuitry further comprises at least one latch for latching at least one index value written by a write instruction as part of writing at least one index and data pair and wherein the system management mode mechanism is not invoked by the write instruction of the index value but which is invoked by the write instruction of the data value.

3. A computer system as recited in claim 2 wherein a plurality of index and data write pairs are gathered without invoking the system management mode mechanism until a predetermined index value is recognized.

4. A computer system as recited in claim 1 further comprising external chipset logic circuitry coupled to the processor wherein the address compare circuitry and acceleration circuitry reside in the chipset logic circuitry.

5. A computer system as recited in claim 4 wherein the chipset logic circuitry invokes the system management mode mechanism by asserting an external pin coupled to the processor.

6. A computer system as recited in claim 1 wherein the address compare circuitry and acceleration circuitry are internal to the processor.

7. A computer system as recited in claim 6 wherein the processor is pipelined including an address calculation stage and the address compare circuitry detects I/O addresses in the address calculation stage.

8. A computer system having an accelerated virtual subsystem architecture comprising:

(a) a motherboard;

(b) a processor disposed on the motherboard running an operating system and at least one program, the processor including address compare circuitry to detect selected I/O instructions executed by the processor while running the at least one program and acceleration circuitry coupled and responsive to the address compare circuitry, to provide status information when the selected I/O instructions are read instructions;

(c) memory disposed on the motherboard and coupled to the processor; and, (d) a system management mode mechanism independent of the operating system and invokable by the acceleration circuitry when the selected I/O instructions are write instructions, to feed instructions to the processor for execution to perform an equivalent function ordinarily performed by a physical subsystem in response to the write instructions.

9. A computer system as recited in claim 8 further comprising chipset logic circuitry coupled to the processor and having address compare circuitry and acceleration circuitry.

10. A computer system as recited in claim 8 wherein the processor is pipelined, including an address calculation stage, and the address compare circuitry detects I/O addresses in the address calculation stage.

11. A computer system as recited in claim 8 wherein the system management mode mechanism is reentrant.

12. A computer system having an accelerated virtual subsystem architecture comprising:

(a) a motherboard;

(b) a processor, running an operating system and at least one program, disposed on the motherboard;

(c) chipset logic circuitry disposed on the motherboard coupled to the processor and including address compare circuitry to detect selected I/O instructions executed by the processor while running the at least one program and acceleration circuitry coupled and responsive to the address compare circuitry, to provide status information when the selected I/O instructions are read instructions;

(d) memory disposed on the motherboard and coupled to the processor; and, (e) a system management mode mechanism independent of the operating system and invokable by the acceleration circuitry when the selected I/O instructions are write instructions, to feed instructions to the processor for execution to perform an equivalent function ordinarily performed by a physical subsystem in response to the write instructions.

13. A computer system as recited in claim 12 wherein the processor is pipelined, including an address calculation stage, and the address compare circuitry detects I/O addresses in the address calculation stage.

14. A computer system as recited in claim 12 wherein the system management mode mechanism is reentrant.

* * * * *